United States Patent

Bermbach et al.

[11] Patent Number: 6,031,890
[45] Date of Patent: Feb. 29, 2000

[54] MONITORING INSTALLATION FOR CONTAINERS AND TRUCKS

[75] Inventors: Rainer Bermbach, Mainz; Gerhard Dönges, Heidenrod-Kemel; Georg Geus, Wiesbaden, all of Germany

[73] Assignee: Heimann Systems GmbH & Co. KG, Wiesbaden, Germany

[21] Appl. No.: 08/222,808

[22] Filed: Apr. 5, 1994

[30] Foreign Application Priority Data

Apr. 5, 1993 [DE] Germany .............................. 43 11 174

[51] Int. Cl.[7] .................................................. G01N 23/04
[52] U.S. Cl. .............................................. 378/57; 378/206
[58] Field of Search ...................................... 378/57, 206

[56] References Cited

U.S. PATENT DOCUMENTS

| 4,357,535 | 11/1982 | Haas . | |
|---|---|---|---|
| 4,599,740 | 7/1986 | Cable . | |
| 5,065,418 | 11/1991 | Bermbach et al. | 378/57 |
| 5,097,494 | 3/1992 | Pantelleria et al. | 378/57 |
| 5,237,598 | 8/1993 | Albert . | |

FOREIGN PATENT DOCUMENTS

| 0 286 393 | 10/1988 | European Pat. Off. . |
|---|---|---|
| 412 190 | 2/1991 | European Pat. Off. . |
| 0 491 977 | 7/1992 | European Pat. Off. . |
| 37 10 502 | 4/1988 | Germany . |
| 40 23 416 | 2/1991 | Germany . |
| 2110037 | 6/1983 | United Kingdom . |
| 93/14419 | 7/1993 | WIPO . |

OTHER PUBLICATIONS

Aschmoneit, "Röntgenanlage 'durchschaut' Frachtgrossbehälter", Technische Rundschau, vol. 79, No. 4, Jan. 23, 1987, 3 pages.

*Primary Examiner*—Craig E. Church
*Attorney, Agent, or Firm*—Venable; Gabor J. Kelemen

[57] ABSTRACT

A monitoring installation for containers and trucks is provided making detection of large items, particularly trucks, at minimal expense possible. An X-ray monitoring installation having low X-ray energy, permits detection of stolen passenger cars, is arranged on a monitoring path.

2 Claims, 1 Drawing Sheet

MONITORING INSTALLATION FOR CONTAINERS AND TRUCKS

CROSS-REFERENCE TO RELATED APPLICATION

The present application claims the right of foreign priority with respect to Application No. P 43 11 174.2 filed in Germany on Apr. 5, 1993, the subject matter which is incorporated herein by reference.

BACKGROUND OF THE INVENTION

1. Field of the Invention

The present invention relates to a device for monitoring the contents of containers and of trucks. More particularly, the present invention relates to an X-ray monitoring installation for monitoring the contents of containers and of trucks.

2. Description of the Related Art

Theft and smuggling of motor vehicles, primarily of luxury-class passenger cars, is becoming an increasingly relevant economic factor.

Studies by agencies have shown that many vehicles are packaged into containers or standard trucks and are smuggled out of a country. Since it is difficult and time-consuming to check trucks and containers, the number of detected crimes of this sort is small.

One solution for detecting such cargo is container radiation systems that have been commercially available for a few years. However, one essential aspect in detecting such cargo is to produce the best possible image for examining whether a particular cargo in general corresponds to an associated shipping list. Of course, it is simultaneously possible to discover certain smuggled goods in this process.

The drawback of these presently available installations is a high cost because of the present technology for obtaining good images (such as the use of high X-ray energy, for example, 2–10 MeV); a relatively low throughput (approximately 25 trucks/h) because protective measures such as gates, an autonomic transport system without a driver, and the prerequisite of large surfaces by shielding measures are required; and the required infrastructure.

SUMMARY OF THE INVENTION

It is an object of the present invention to provide a monitoring system for containers and trucks which allows detection of large items, especially concealed passenger cars.

The basis for the invention is to produce a simple X-ray such as is known through luggage monitors at airports. The expenditures for these are clearly limited. Standard components may be used extensively or, at least, may be slightly modified to serve as the X-ray source and X-ray detector. As trials and measurements have shown, relatively low currents (for example, 1 mA) and X-ray energies (for example 140 keV) are sufficient to produce images that unequivocally demonstrate the presence of passenger cars in containers or trucks.

Due to the low dose of X-rays (on the inside of a container the dose is typically less than 1/10,000 of a medical mammogram), further streamlining of the inspection process is permissible as well. The driver of the truck or container transport need not leave his driver cab; he may guide the vehicle himself through the monitoring system. However, an ingenious safety system prevents the driver cab from being X-rayed despite the low dosage.

The main areas for using such a monitoring and detection system are, for example, border crossings, ocean harbors and toll booths, but mobile, versatile systems are also possible.

In addition to detecting stolen motor vehicles, further information can, of course, to a limited extent, be obtained from X-ray images. This depends on the irradiation dosage used, the quality of the detectors, and the optimization of data processing. However, the main emphasis is on detection of passenger cars.

These and other objects are achieved by the present invention which provides a monitoring installation for monitoring containers and trucks including at least one monitoring path through which a truck passes with a driver of the truck driving the truck, an X-ray source located along the monitoring path for producing low-energy X-rays directed at a cargo area of the truck, and an X-ray detector located along the monitoring path and arranged to receive X-rays from the X-ray source after the X-rays have passed through the cargo area of the truck. Preferably, the monitoring path is open and the X-ray detector, which is formed by a series of detector members, detects vehicles concealed in the cargo area of the truck.

The invention also includes a light barrier located along the monitoring path for activating the X-ray source after the vehicle cab, occupied by the driver, has passed the monitoring installation.

DETAILED DESCRIPTION OF THE PREFERRED EMBODIMENT

Figure 1:
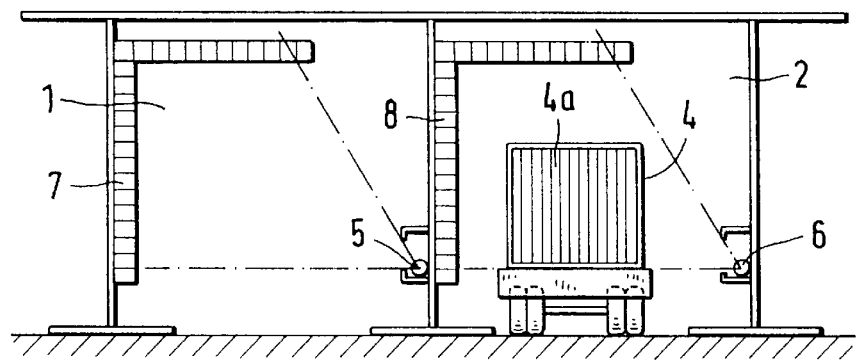
FIG. 1 is a schematic rear elevational view of a preferred embodiment of the invention.
Figure 2:
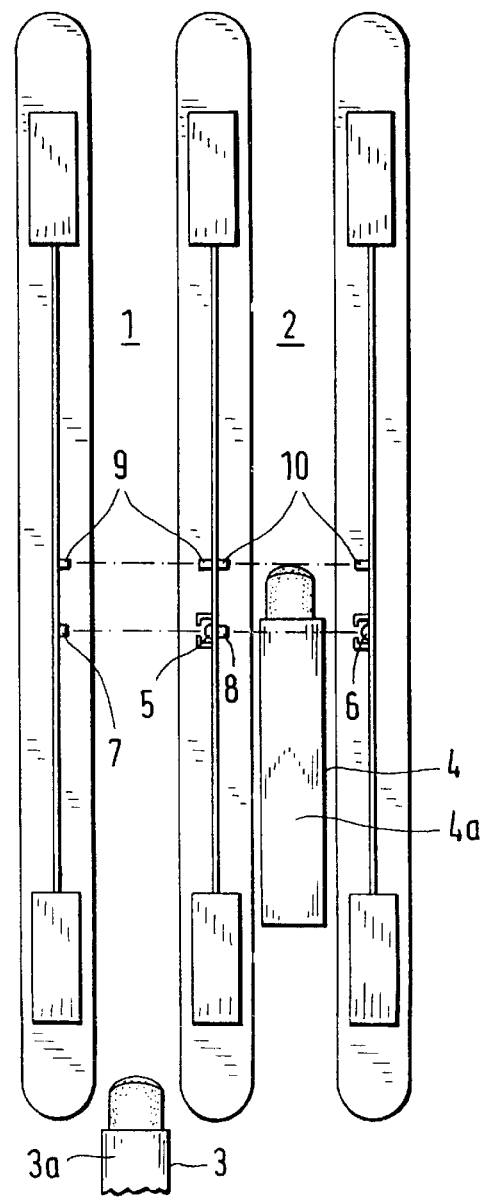
FIG. 2 is a schematic top plan view of the preferred embodiment.

FIGS. 1 and 2 show a monitoring installation having two monitoring paths 1, 2 constituting drive paths through which trucks 3, 4 carrying containers 3a, 4a or trucks having standard components are driven by their respective drivers. Each monitoring path 1, 2 has an X-ray monitoring installation, including an X-ray source 5, 6 and a detector 7, 8 forming an angular area. Detectors 7, 8 are formed by a series of detector members each having an output signal which is converted in a known manner into an image of the X-rayed region of each respective truck 3, 4 or container 3a, 4a.

The drivers of each truck drive their trucks 3, 4 in a forward driving direction through the open monitoring paths 1, 2, i.e., the monitoring paths are not closed off by gates. Light barriers 9, 10 or comparable systems cause the X-rays to be switched off while the driver cab passes through each respective X-ray monitoring installation 5, 7 and 6, 8. That is, each respective X-ray monitoring system 5, 7 and 6, 8 is first activated when the front face of the driver cab arrives at the light barrier 9, 10 which is distinctly beyond the path of the X-ray beams, that is, the light barrier is located downstream of the X-ray source with respect to the direction of truck advance.

It will be understood that the above description of the present invention is susceptible to various modifications, changes and adaptations which are intended to be comprehended within the meaning and range of equivalents of the appended claims.

What is claimed:

1. A monitoring installation for monitoring containers and trucks, comprising:

a drive path through which a truck passes with a driver of the truck driving the truck;

a low-energy and low-current X-ray source having an energy of maximum 140 keV and a current of maximum 1 mA; said X-ray source being located along the drive path for producing X-rays directed at a cargo area of the truck;

an X-ray detector located along the drive path and arranged to receive X-rays from the X-ray source after the X-rays have passed through the cargo area of the truck; and light barrier means positioned along said drive path for activating said X-ray source when a cab of the truck has passed the X-ray source.

2. The monitoring installation according to claim 1, wherein said light barrier means comprises a light barrier located downstream of the X-ray source with respect to a direction of truck advance.

* * * * *